United States Patent
Sugano et al.

(10) Patent No.: US 9,555,756 B2
(45) Date of Patent: Jan. 31, 2017

(54) VEHICLE FRONT STRUCTURE

(71) Applicant: Toyota Jidosha Kabushiki Kaisha, Toyota-shi (JP)

(72) Inventors: Chitoshi Sugano, Toyota (JP); Yasunori Iwamoto, Toyota (JP); Kenichi Murayama, Kumagaya (JP)

(73) Assignee: TOYOTA JIDOSHA KABUSHIKI KAISHA, Toyoto-shi (JP)

( * ) Notice: Subject to any disclaimer, the term of this patent is extended or adjusted under 35 U.S.C. 154(b) by 0 days.

(21) Appl. No.: 14/817,612

(22) Filed: Aug. 4, 2015

(65) Prior Publication Data

US 2016/0039374 A1 Feb. 11, 2016

(30) Foreign Application Priority Data

Aug. 5, 2014 (JP) ................................. 2014-159670

(51) Int. Cl.
*B60R 19/34* (2006.01)
*B62D 21/15* (2006.01)
(Continued)

(52) U.S. Cl.
CPC ............... *B60R 19/34* (2013.01); *B60R 19/04* (2013.01); *B62D 21/152* (2013.01); *F16F 7/12* (2013.01); *B60R 2021/0023* (2013.01)

(58) Field of Classification Search
CPC ....... A63H 17/26; B60F 1/005; B60G 17/019; B60G 2300/26; B60G 5/047; B60K 23/0808; B60T 8/1755; B60T 8/266; B60T 8/4872; B62D 7/159
(Continued)

(56) References Cited

U.S. PATENT DOCUMENTS 6,866,115 B2 * 3/2005 Miyasaka ............... B60R 19/00
180/311
8,398,153 B1 * 3/2013 Dandekar ............ B62D 21/152
296/187.09
(Continued)

FOREIGN PATENT DOCUMENTS

JP 2006-137373 6/2006
JP 2010-132122 6/2010
(Continued)

*Primary Examiner* — Kiran B Patel
(74) *Attorney, Agent, or Firm* — Oblon, McClelland, Maier & Neustadt, L.L.P.

(57) ABSTRACT

A vehicle front structure includes: a pair of right and left front side members extending in the vehicle front-rear direction; load receiving members each projecting from a corresponding one of the front side members outward in the vehicle-width direction, having an outer side surface in the vehicle-width direction, which is tilted inward in the vehicle-width direction from the vehicle front side toward the vehicle rear side; and protruding members each disposed forward of a corresponding one of the load receiving members in the vehicle front-rear direction, each protruding forward in the vehicle front-rear direction, and each having a front end portion and a rear end portion, the rear end portion being fixed at a position at which at least a part of the protruding member overlaps with the corresponding load receiving member in a front view of the vehicle, and the front end portion being a free end.

6 Claims, 3 Drawing Sheets

(51) Int. Cl.
*B60R 19/04* (2006.01)
*F16F 7/12* (2006.01)
*B60R 21/00* (2006.01)

(58) Field of Classification Search
USPC .......................................... 293/133, 117, 120
See application file for complete search history.

(56) References Cited

U.S. PATENT DOCUMENTS

| | | | | |
|---|---|---|---|---|
| 9,010,845 | B1* | 4/2015 | Ramoutar | B60R 19/14 |
| | | | | 293/155 |
| 9,067,549 | B2* | 6/2015 | Baccouche | B62D 21/152 |
| 9,126,550 | B2* | 9/2015 | Nusier | B62D 21/152 |
| 9,233,714 | B2* | 1/2016 | Hara | B62D 21/09 |
| 9,242,673 | B2* | 1/2016 | Okamoto | B60R 19/02 |
| 2003/0025359 | A1* | 2/2003 | Takahashi | B62D 21/155 |
| | | | | 296/203.02 |
| 2003/0090099 | A1* | 5/2003 | Miyasaka | B60G 7/02 |
| | | | | 280/784 |
| 2011/0012381 | A1* | 1/2011 | Saito | B60R 19/34 |
| | | | | 293/133 |
| 2011/0193357 | A1* | 8/2011 | Klimek | B60R 19/34 |
| | | | | 293/133 |
| 2012/0248820 | A1* | 10/2012 | Yasui | B60R 19/34 |
| | | | | 296/187.09 |
| 2013/0241233 | A1* | 9/2013 | Ohnaka | B62D 21/152 |
| | | | | 296/187.1 |
| 2013/0256051 | A1* | 10/2013 | Nakamura | B62D 21/155 |
| | | | | 180/271 |
| 2013/0320709 | A1* | 12/2013 | Kuwabara | B62D 25/082 |
| | | | | 296/187.09 |
| 2014/0035325 | A1* | 2/2014 | Naito | B62D 25/082 |
| | | | | 296/203.02 |
| 2014/0062106 | A1 | 3/2014 | Han | |
| 2014/0091585 | A1* | 4/2014 | Ramoutar | B60R 19/24 |
| | | | | 293/133 |
| 2014/0091595 | A1* | 4/2014 | Ramoutar | B60R 19/24 |
| | | | | 296/187.09 |
| 2014/0159420 | A1* | 6/2014 | Hashimoto | B62D 21/152 |
| | | | | 296/187.1 |
| 2014/0203578 | A1* | 7/2014 | Kaneko | B60R 19/34 |
| | | | | 293/133 |
| 2014/0361559 | A1* | 12/2014 | Sakakibara | B60R 19/34 |
| | | | | 293/133 |
| 2014/0361560 | A1* | 12/2014 | Sakakibara | B62D 21/152 |
| | | | | 293/133 |
| 2015/0069785 | A1 | 3/2015 | Sakakibara et al. | |
| 2015/0076862 | A1* | 3/2015 | Abe | B62D 21/152 |
| | | | | 296/187.1 |
| 2016/0121931 | A1* | 5/2016 | Tamaoki | B62D 21/152 |
| | | | | 296/187.09 |

FOREIGN PATENT DOCUMENTS

| | | |
|---|---|---|
| JP | 2012-35704 | 2/2012 |
| JP | 2013-212757 | 10/2013 |
| JP | 2014-113891 A | 6/2014 |
| JP | 2015-54589 | 3/2015 |
| KR | 10-2014-0030763 A | 3/2014 |

\* cited by examiner

VEHICLE FRONT STRUCTURE

INCORPORATION BY REFERENCE

The disclosure of Japanese Patent Application No. 2014-159670 filed on Aug. 5, 2014 including the specification, drawings and abstract is incorporated herein by reference in its entirety.

BACKGROUND OF THE INVENTION

1. Field of the Invention

The invention relates to a vehicle front structure.

2. Description of Related Art

There is a known technique for absorbing a collision load in the event of a front end collision of a vehicle. According to the technique, a pair of right and left front side members extending in the vehicle front-rear direction is disposed in the front part of the vehicle, and crash boxes are disposed at the front ends of the front side members. In the event of a front end collision, the front side members and the crash boxes are compressed or deformed in the vehicle front-rear direction, thereby absorbing a collision load.

In some cases, however, a colliding object collides with only a portion of the front part of the vehicle in the vehicle-width direction instead of colliding with the entirety of the front part of the vehicle (i.e., a frontal offset collision occurs). Especially in the event of a collision with a small amount of overlap between a colliding object and the vehicle in the vehicle-width direction (i.e., a small overlap collision), a collision load is input mainly into a portion of the front part located on the outside of the front side member in the vehicle-width direction, in the vehicle front structure configured as described above. Thus, the collision load is not sufficiently absorbed in the front part of the vehicle.

In view of this, Japanese Patent Application Publication No. 2013-212757 (JP 2013-212757 A) describes a vehicle front structure provided with members that protrude from front side members outward in the vehicle-width direction to receive collision loads input from ahead of a vehicle. Thus, even when a small overlap collision occurs, it is possible to absorb a collision load input from ahead of the vehicle, by transmitting the collision load to the front side members or by deforming the front side members. Note that, not only JP 2013-212757 A but also Japanese Patent Application Publication No. 2010-132122 (JP 2010-132122 A) and Japanese Patent Application Publication No. 2006-137373 (JP 2006-137373 A) describe a vehicle front structure provided with members disposed on the outer sides of front side members in the vehicle-width direction to receive collision loads.

According in particular to JP 2013-212757 A and JP 2010-132122 A, a collision load applied to the front part of the vehicle in the event of an offset collision is transmitted to the front side members from the members attached to the outer sides of the front side members in the vehicle-width direction to deform the front side members, so that the collision load is absorbed through the deformation of the front side members.

SUMMARY OF THE INVENTION

However, there is still room for improvement in techniques for deforming front side members more stably to efficiently absorb collision energy in the event of an offset collision.

The invention provides a vehicle front structure capable of more efficiently absorbing collision energy input from ahead of a vehicle in the event of an offset collision.

A vehicle front structure according to an aspect of the invention includes a pair of right and left front side members extending in a vehicle front-rear direction, load receiving members, and protruding members. Each of the load receiving members projects from a corresponding one of the front side members outward in a vehicle-width direction. Each of the load receiving members has an outer side surface in the vehicle-width direction, and the outer side surface is tilted inward in the vehicle-width direction from the vehicle front side toward the vehicle rear side. Each of the protruding members is disposed forward of a corresponding one of the load receiving members in the vehicle front-rear direction. Each of the protruding members protrudes forward in the vehicle front-rear direction. Each of the protruding members has a front end portion and a rear end portion. The rear end portion is fixed at a position at which at least a part of the protruding member overlaps with the corresponding load receiving member in a front view of the vehicle. The front end portion is a free end.

According to the foregoing aspect of the invention, the load receiving member is provided on the outer side of each front side member in the vehicle-width direction, and the protruding member protruding forward in the vehicle front-rear direction is disposed on the front surface of each load receiving member. Thus, in the event of a collision with a small amount of overlap between a colliding object and the vehicle (i.e., a small overlap collision), the front side members are deformed earlier to absorb a collision load.

The vehicle front structure according to the foregoing aspect of the invention produces an advantageous effect of enhancing the impact absorbing performance in the event of an offset collision.

In the foregoing aspect, the front end portion of each of the protruding members may be located outward, in the vehicle-width direction, of the center of a front wall of a corresponding one of the load receiving members in the vehicle-width direction.

With this configuration, a load from the protruding member is transmitted to the front wall of the load receiving member, at a position located outward, in the vehicle-width direction, of the center of the front wall of the load receiving member in the vehicle-width direction. This increases a moment in such a direction that the front side member is bent inward in the vehicle-width direction.

The vehicle front structure having the above-described configuration produces an advantageous effect of stably deforming the front side members.

In the foregoing aspect, at least a part of a front surface of each of the protruding members in the vehicle front-rear direction may be tilted inward in the vehicle-width direction so as to be oriented toward the center side in the vehicle-width direction.

In this configuration, the front surface of each protruding member is oriented toward the center side in the vehicle-width direction. Thus, a load applied from ahead of the vehicle is transmitted rearward to the load receiving member. This increases a moment in such a direction that the front side member is bent inward in the vehicle-width direction.

The vehicle front structure having the above-described configuration produces an advantageous effect of stably deforming the front side members.

The vehicle front structure according to the foregoing aspect may further include impact absorbing members and a bumper reinforcement. Each of the impact absorbing members is disposed forward of a corresponding one of the front side members, and each of the impact absorbing members extends forward in the vehicle front-rear direction beyond the front end portion of a corresponding one of the protruding members. The bumper reinforcement is connected to front ends of the impact absorbing members, and the bumper reinforcement extends in the vehicle-width direction. Each of the protruding members and the bumper reinforcement may be disposed apart from each other in the vehicle front-rear direction.

In this configuration, the impact absorbing members are disposed forward of the front side members in the vehicle front-rear direction, and extend forward in the vehicle front-rear direction beyond the front end portions of the protruding members. That is, the bumper reinforcement and each protruding member are apart from each other in the vehicle front-rear direction. Thus, the impact absorbing member is subjected to compressive deformation until the bumper reinforcement comes into contact with the protruding member. Thus, the energy at the initial stage of a collision is absorbed by the impact absorbing member at a position forward of the front side member. Therefore, this configuration is effective especially in a collision with a large amount of overlap between a colliding object and the vehicle.

The vehicle front structure having the above-described configuration produces an advantageous effect of sufficiently absorbing a collision impact regardless of the mode of collision, that is, regardless of whether the collision is a small overlap collision or a collision with a large amount of overlap between a colliding object and the vehicle.

In the foregoing aspect, the front end portion of each of the protruding members and a corresponding one of the front side members may be disposed apart from each other in the vehicle-width direction.

In this configuration, each protruding member is apart from the corresponding front side member in the vehicle-width direction. Thus, it is possible to increase a moment input into the front side member, thereby efficiently bending the front side member.

The vehicle front structure having the above-described configuration produces an advantageous effect of absorbing energy at the intimal stage of a collision.

The vehicle front structure according to the foregoing aspect may further include load transmitting members. Each of the load transmitting members connects a front end of a corresponding one of the front side members to a front end of a corresponding one of the load receiving members, and each of the load transmitting members extends in the vehicle-width direction. Each of the protruding members may be attached to a front surface of a corresponding one of the load transmitting members in the vehicle front-rear direction.

In this configuration, the front end of the front side member and the front end of the load receiving member are connected to each other by the load transmitting member. Thus, a load applied to a position outward of the front side member in the vehicle-width direction in the event of an offset collision is transmitted also to the front end of the front side member.

The vehicle front structure having the above-described configuration produces an advantageous effect of efficiently transmitting a load in the event of an offset collision to the front side member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
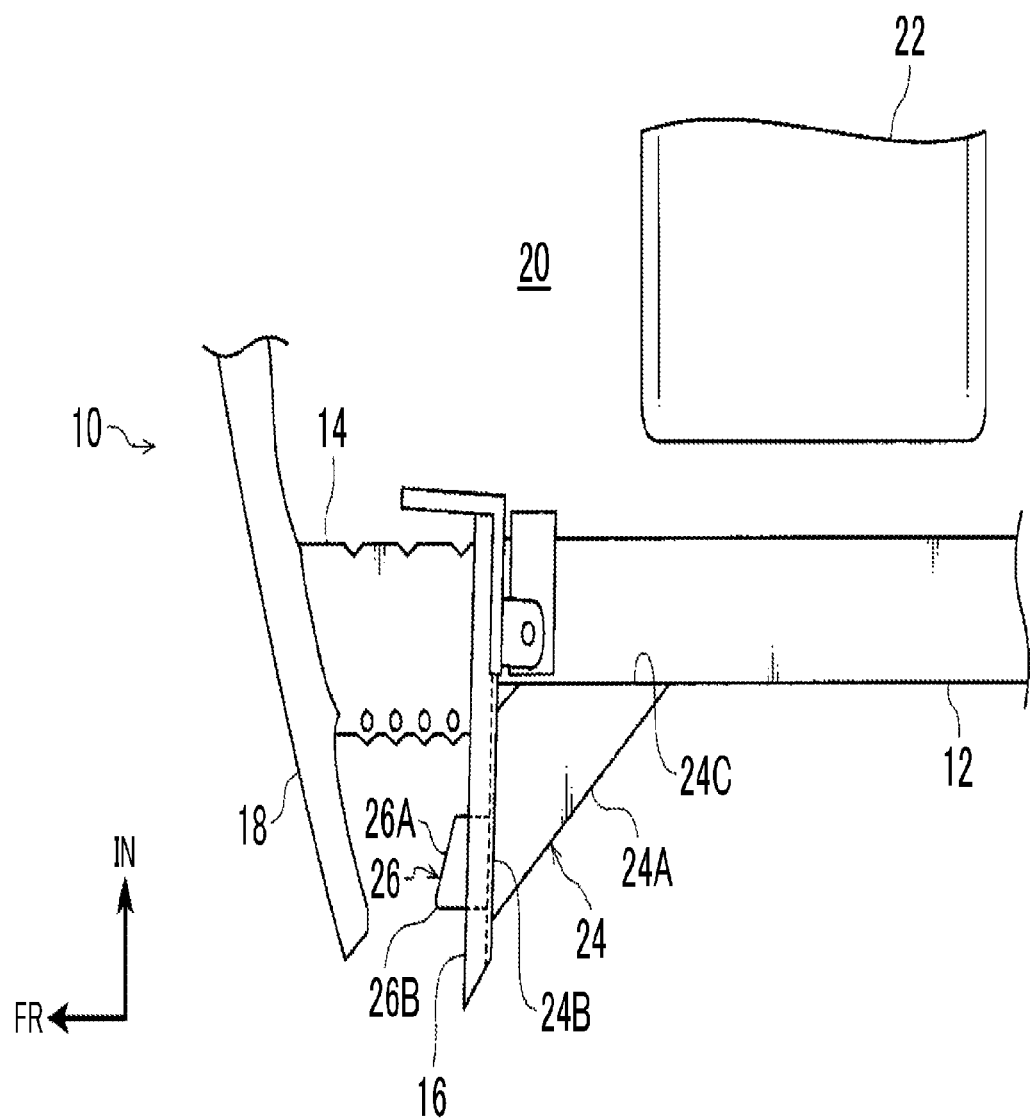
FIG. 1 is a plan view of a vehicle front structure according to a first embodiment of the invention.

Hereinafter, a vehicle front structure according to a first embodiment of the invention will be described with reference to FIG. 1 and FIG. 2. While FIG. 1 and FIG. 2 both illustrate the front structure on the left side of a vehicle, the front structure on the right side of the vehicle (not illustrated) is the same as that on the left side of the vehicle. Note that, in the drawings, an arrow FR indicates "forward in the vehicle front-rear direction", and an arrow IN indicates "inward in the vehicle-width direction". In the following description, for example, "front", "rear", "behind", "forward" and "rearward" denote positions and directions in the vehicle front-rear direction, and, for example, "inner", "outer", "inward" and "outward" denote positions and directions in the vehicle-width direction.

As illustrated in FIG. 1, a pair of right and left front side members 12, which are vehicle frame members, extends in the vehicle front-rear direction. The right front side member 12 and the left front side member 12 are disposed respectively on the right side and the left side of the front part of a vehicle body. The front side members 12 are connected at their rear ends to a floor member (not illustrated).

An engine compartment 20 is provided between the right and left front side members 12, and a power unit 22 is disposed inside the engine compartment 20. The power unit 22 is disposed at a position at which the power unit 22 overlaps with the front side members 12 in the vehicle up-down direction in a side view of the vehicle. The power unit 22 is located adjacent to the front side members 12. Note that the power unit 22 is a heavy and rigid component such as an engine, a transmission, or a torque converter. In a hybrid vehicle or an electric vehicle, the power unit 22 is a heavy and rigid component such as a motor.

A plate member 16, which may function as a load transmitting member in the invention, is fixed to the front end of each front side member 12, for example, by welding. The plate member 16 extends to a position outside the front side member 12 in the vehicle-width direction. Further, an impact absorbing member 14 is disposed on a front surface of each plate member 16, and connected to the plate member 16, for example, by bolting.

A bumper reinforcement 18 is disposed forward of the right and left impact absorbing members 14. The bumper reinforcement 18 extends in the vehicle-width direction. The bumper reinforcement 18 is connected to the front ends of the right and left impact absorbing members 14.

Further, a load receiving member 24, which is generally triangular in a plan view of the vehicle, is disposed on the outer side of the front end portion of each front side member 12 in the vehicle-width direction. Each load receiving member 24 has an outer wall 24A, a front wall 24B, and an inner wall 24C. The front wall 24B constitutes a front portion of the load receiving member 24, and extends in the vehicle-width direction. The inner wall 24C constitutes an inner side portion of the load receiving member 24 in the vehicle-width direction, and extends in the vehicle front-rear direction. The outer wall 24A is an outer side surface of the load receiving member 24 in the vehicle-width direction. The outer wall 24A connects the outer end of the front wall 24B to the rear end of the inner wall 24C. The outer wall 24A is tilted inward in the vehicle-width direction from the front side of the vehicle toward the rear side of the vehicle. More specifically, the outer wall 24A is tilted inward in the vehicle-width direction such that the distance between the outer wall 24A and the front side member 12 decreases in a direction from the front side of the vehicle toward the rear side of the vehicle. The outer wall 24A is provided with a bead (projection) (not illustrated) disposed substantially in the vehicle front-rear direction along the longitudinal direction of the outer wall 24A in a plan view, so that the strength against loads in the vehicle front-rear direction is enhanced.

The inner wall 24C of the load receiving member 24 and an outer side surface of the front side member 12 are fixed together by fixing means (not illustrated) at multiple positions aligned in the vehicle front-rear direction. In this way, the load receiving member 24 is attached to the front side member 12. The rear end of the inner wall 24C of the load receiving member 24 is located at a position at which the rear end of the inner wall 24C overlaps with the power unit 22 in a side view of the vehicle. The plate member 16 extending from the front end of the front side member 12 is disposed forward of the load receiving member 24. A rear surface of the plate member 16 is fixed also to the front wall 24B of the load receiving member 24. That is, the front end of the front side member 12 and the front end of the load receiving member 24 are flush with each other in the vehicle front-rear direction.

Further, a protruding member 26 is attached, for example, by welding, to the front surface of the plate member 16 to which the front wall 24B of the load receiving member 24 is connected. The protruding member 26 is attached to the front surface of the plate member 16, at a position offset outward in the vehicle-width direction from the front side member 12. A part of a front surface 26A of the protruding member 26 is tilted in the vehicle-width direction so as to be oriented toward the center side in the vehicle-width direction. A front end portion 26B of the protruding member 26 is a free end. The front end portion 26B of the protruding member 26 is located outward, in the vehicle-width direction, of the center of the front wall 24B of the load receiving member 24 in the vehicle-width direction.

In the first embodiment, the two ends of the bumper reinforcement 18 extend outward in the vehicle-width direction beyond the load receiving members 24 in a front view of the vehicle. That is, the two end portions of the bumper reinforcement 18 overlap also with the protruding members 26, which are disposed forward of the load receiving members 24, in a front view of the vehicle.

The protruding member 26 in a broad sense is an element that is regarded as "load input member", and examples of the load input member include a structure in which a protruding portion corresponding to the protruding member 26 is formed integrally with the load receiving member 24 or the plate member 16. That is, the protruding member 26 may be located on the front surface of the plate member 16 and formed integrally with the plate member 16. If the plate member 16 is not provided, the protruding member 26 may be located on the front wall 24B of the load receiving member 24 and formed integrally with the load receiving member 24.

Next, the operation and advantageous effects of the first embodiment of the invention will be described.

Figure 2:
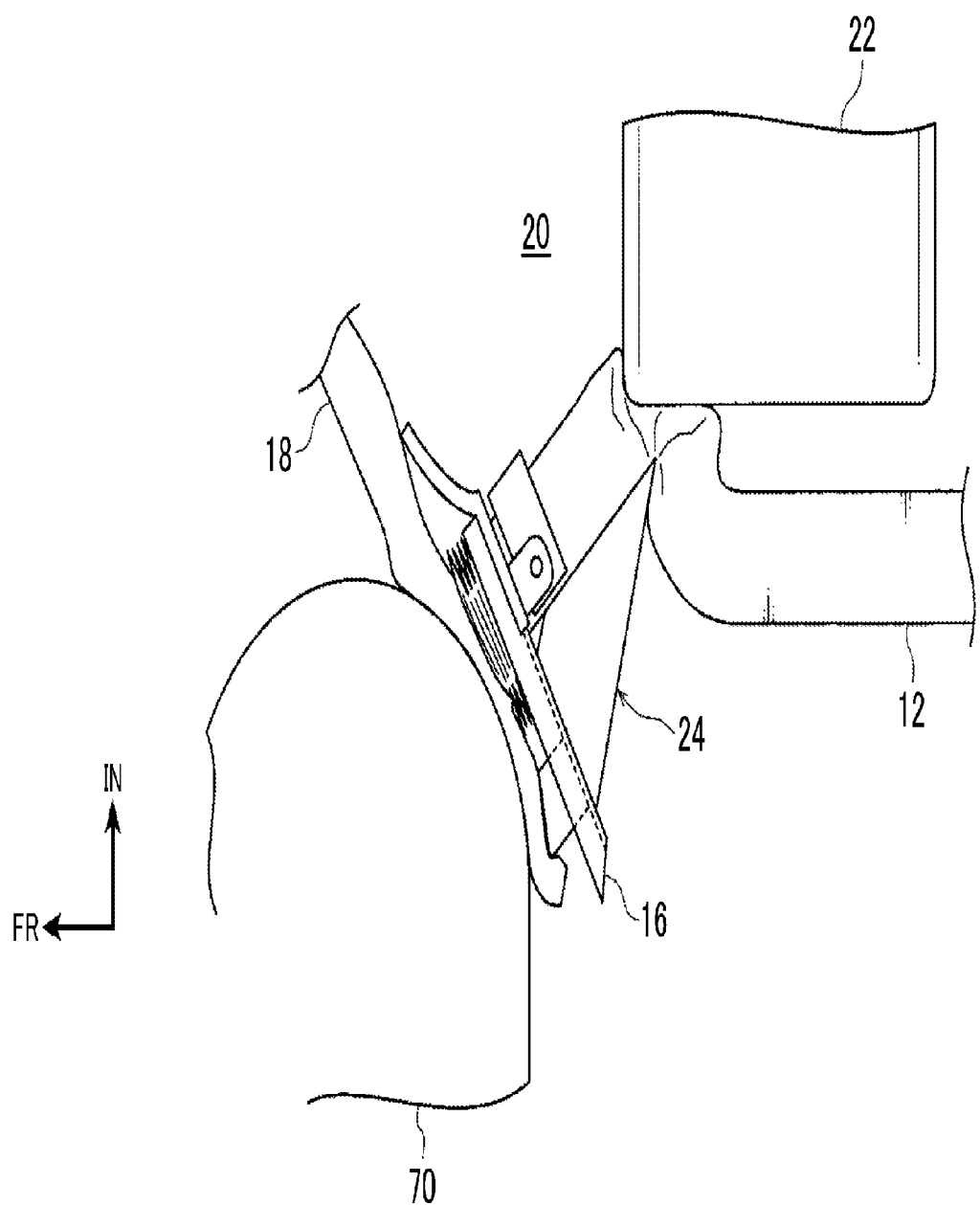
FIG. 2 is a plan view illustrating deformation caused in the vehicle front structure illustrated in FIG. 1 in the event of an offset collision.

With reference to FIG. 2, description will be provided on a case where a colliding object 70 collides, from ahead of the vehicle having the vehicle front structure 10 described above, with only a portion of the front part of the vehicle in the vehicle-width direction (i.e. a frontal offset collision occurs). The colliding object 70 may be, for example, an oncoming vehicle or a utility pole.

The colliding object 70 first collides with the bumper reinforcement 18, and a collision load is transmitted rearward through the bumper reinforcement 18. The collision load transmitted to the bumper reinforcement 18 is transferred to the impact absorbing member 14 disposed behind the bumper reinforcement 18, and the impact absorbing member 14 undergoes compressive deformation in the vehicle front-rear direction to absorb the collision load.

As the bumper reinforcement 18 is displaced further rearward while compressing the impact absorbing member 14 to absorb the impact, the bumper reinforcement 18 comes into contact with the protruding member 26 that has been disposed behind the bumper reinforcement 18 at a position apart from the bumper reinforcement 18.

The collision load applied from the bumper reinforcement 18 to the protruding member 26 is transmitted to the plate member 16. The collision load transmitted to the plate member 16 is then transmitted to the load receiving member 24 located behind the plate member 16. A part of the collision load is transmitted also to the front end of the front side member 12 through the plate member 16.

The collision load transmitted from the protruding member 26 to the load receiving member 24 is transferred to the front side member 12 and is then transmitted rearward. At this time, a bending moment is input into the front side member 12 from a rear end portion of the load receiving member 24. As a result, the front side member 12 is bent inward in the vehicle-width direction, at a position at which the front side member 12 is in contact with the rear end portion of the load receiving member 24.

The power unit 22 is disposed inward of the rear end portion of the load receiving member 24 in the vehicle-width direction. Thus, the front side member 12 bent as described above comes into contact with the power unit 22, so that the collision load is transmitted also to the power unit 22. As a result, the collision load is absorbed efficiently in the vehicle front part.

The protruding member 26 is disposed at a position offset outward in the vehicle-width direction from the front side member 12. Thus, a moment arm length in the vehicle front-rear direction with respect to the position at which the front side member 12 is bent (the rear end portion of the load receiving member 24) is made longer. That is, a moment that acts on the front side member 12 is increased, and thus the front side member 12 is bent more easily.

Because the protruding member 26 is disposed on the front surface of the plate member 16 attached to the load receiving member 24, it is possible to transmit a collision load to the load receiving member 24 from the same position regardless of the mode of collision. That is, it is possible to transmit a collision load to the load receiving member 24 more stably than in a case where the bumper reinforcement 18 is provided with members that protrude rearward.

The front surface 26A of the protruding member 26 is tilted in the vehicle-width direction so as to be oriented toward the center side in the vehicle-width direction. That is, the front surface 26A is tilted outward in the vehicle-width direction toward the front side of the vehicle. More specifically, the front surface 26A is tilted outward in the vehicle-width direction such that the distance between the front surface 26A and the plate member 16 increases in a direction from the inside toward the outside in the vehicle-width direction. Due to this tilt, the load from the bumper reinforcement 18 is transmitted to the load receiving member 24 in a direction tilted outward in the vehicle-width direction. Thus, a moment that acts on the front side member 12 is increased.

To increase the moment that acts on the front side member 12, preferably, the front surface 26A of the protruding member 26 and the outer wall 24A of the load receiving member 24 are made parallel to each other. Further, inputting a load from the protruding member 26 into the outer end portion of the front wall 24B of the load receiving member 24 makes it possible to increase the moment arm length, thereby increasing the moment that acts on the front side member 12. For this reason, in the first embodiment, the protruding member 26 and the load receiving member 24 are disposed such that the outer end portion of the protruding member 26 and the outer end portion of the load receiving member 24 are flush with each other in the vehicle-width direction.

In the first embodiment, the bumper reinforcement 18 and the protruding member 26 are disposed apart from each other in the vehicle front-rear direction. Thus, in the event of a minor collision, a collision load is absorbed by the impact absorbing member 14, so that the collision load is not transmitted to the protruding member 26. That is, the front side member 12 is not deformed by the load receiving member 24 in the event of a minor collision. This contributes to reduction in repair cost.

The bumper reinforcement 18 and the protruding member 26 are disposed apart from each other. Thus, even when a collision with the entirety of the vehicle front side overlapped with a collision body in the vehicle-width direction (i.e., a full overlap collision) occurs, an impact in the initial stage of the collision is absorbed as the right and left impact absorbing members 14 undergo compressive deformation in the vehicle front-rear direction. That is, it is possible to absorb an impact regardless of the mode of collision, that is, regardless of whether the collision is a full overlap collision or a small overlap collision.

Next, a second embodiment of the invention will be described with reference to FIG. 3. Note that the components that are the same as those in the first embodiment will be denoted by the same reference symbols and details thereof will be omitted from the following description.

Figure 3:
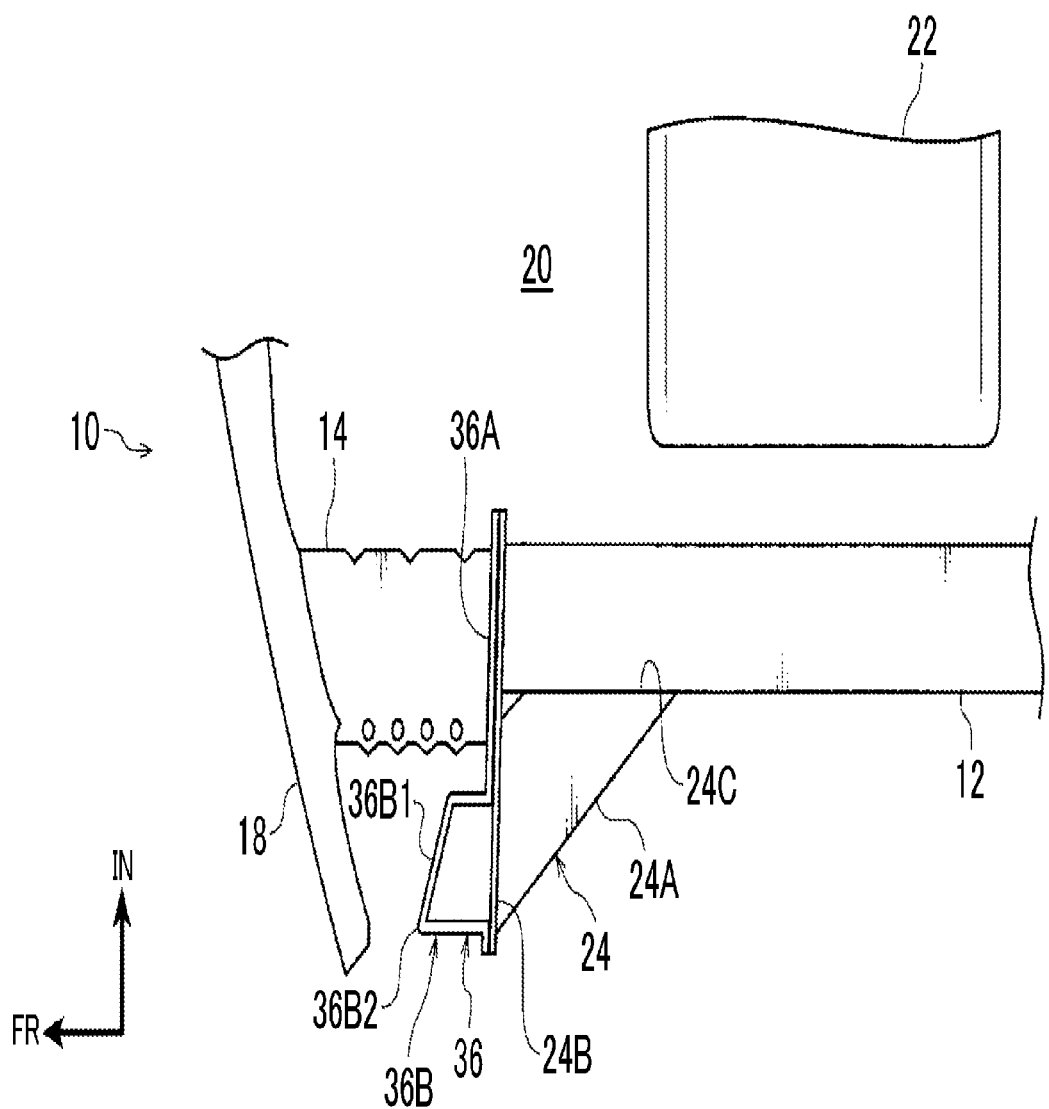
FIG. 3 is a plan view of a vehicle front structure according to a second embodiment of the invention.

A protruding member 36 in the second embodiment illustrated in FIG. 3 differs from the protruding member 26 in the first embodiment in that the protruding member 36 extends in the vehicle-width direction and an inner end portion thereof in the vehicle-width direction is connected to the front end of the front side member 12. More specifically, the protruding member 36 has a base portion 36A and a protruding portion 36B. The base portion 36A is in the form of a plate and is fixed to the front end of the front side member 12. The protruding portion 36B is formed integrally with the base portion 36A, and located outward of the base portion 36A in the vehicle-width direction. The protruding portion 36B has the same shape as that of the protruding member 26. Like the protruding member 26, the protruding portion 36B has a front wall 36B1 (corresponding to the front wall 26A) and a front end portion 36B2 (corresponding to the front end portion 26B). As described above, a part of the protruding member 36 is connected to the front end of the front side member 12. Thus, the protruding portion 36B is able to not only fulfill the same function as that of the protruding member 26 in the first embodiment but also transmit a part of a collision load to the front end of the front side member 12.

Needless to say, the invention is not limited to the foregoing embodiments and various modifications may be made to the foregoing embodiments within the scope of the invention.

In each of the foregoing embodiments, the front surface 26A (36B1) of the protruding member 26 (36) is tilted in the vehicle-width direction so as to be oriented toward the center side in the vehicle-width direction, but the configuration of the protruding member 26 (36) is not limited to this. For example, the front surface 26A (36B1) may be tilted at an angle in the vehicle front-rear direction, or may be tilted at an angle in both the vehicle front-rear direction and the vehicle-width direction. Alternatively, the protruding member 26 (36) may protrude forward with the front surface 26A (36B1) being tilted neither in the vehicle front-rear direction nor in the vehicle-width direction.

In the foregoing embodiments, the front surface 26A (36B1) of the protruding member 26 (36) is tilted at a constant rate of change. However, the front surface 26A (36B1) may be tilted at different rates of change such that a part of the front surface 26A forms a protrusion that protrudes forward.

FIG. 1 to FIG. 3 illustrate the front structure on the left side of the vehicle, and the front structure on the right side of the vehicle is the same as that on the left side of the vehicle. However, the front structure on the right side of the vehicle may differ from that on the left side of the vehicle. For example, the load receiving member 24 on the right side and the load receiving member 24 on the left side may differ in shape from each other.

The front end of the load receiving member 24 may be located on the rear side of the front end of the front side member 12 instead of being flush with the front end of the front side member 12. In this case, the plate member 16 may be bent in the vehicle front-rear direction.

What is claimed is:

1. A vehicle front structure comprising:
   a pair of right and left front side members extending in a vehicle front-rear direction;
   load receiving members each projecting from a corresponding one of the front side members outward in a vehicle-width direction, each of the load receiving members having an outer side surface in the vehicle-width direction, and the outer side surface being tilted inward in the vehicle-width direction from a vehicle front side toward a vehicle rear side; and
   protruding members each disposed forward of a corresponding one of the load receiving members in the vehicle front-rear direction, each of the protruding members protruding forward in the vehicle front-rear direction, each of the protruding members having a front end portion and a rear end portion, the rear end portion being fixed at a position at which at least a part of the protruding member overlaps with the corresponding load receiving member in a front view of the vehicle, and the front end portion being a free end.

2. The vehicle front structure according to claim 1, wherein the front end portion of each of the protruding members is located outward, in the vehicle-width direction, of a center of a front wall of a corresponding one of the load receiving members in the vehicle-width direction.

3. The vehicle front structure according to claim 1, wherein at least a part of a front surface of each of the protruding members in the vehicle front-rear direction is tilted inward in the vehicle-width direction so as to be oriented toward a center side in the vehicle-width direction.

4. The vehicle front structure according to claim 1, further comprising:
impact absorbing members each disposed forward of a corresponding one of the front side members, and each of the impact absorbing members extending forward in the vehicle front-rear direction beyond the front end portion of a corresponding one of the protruding members; and
a bumper reinforcement connected to front ends of the impact absorbing members, and the bumper reinforcement extending in the vehicle-width direction,
wherein each of the protruding members and the bumper reinforcement are disposed apart from each other in the vehicle front-rear direction.

5. The vehicle front structure according to claim 1, wherein the front end portion of each of the protruding members and a corresponding one of the front side members are disposed apart from each other in the vehicle-width direction.

6. The vehicle front structure according to claim 1, further comprising load transmitting members each connecting a front end of a corresponding one of the front side members to a front end of a corresponding one of the load receiving members, and each of the load transmitting members extending in the vehicle-width direction,
wherein each of the protruding members is attached to a front surface of a corresponding one of the load transmitting members in the vehicle front-rear direction.

* * * * *